(12) United States Patent
Fox et al.

(10) Patent No.: US 8,511,087 B2
(45) Date of Patent: Aug. 20, 2013

(54) FUEL INJECTOR AND SWIRLER ASSEMBLY WITH LOBED MIXER

(75) Inventors: Timothy A. Fox, Hamilton (CA); Steven Williams, Charlotte, NC (US); Ulrich Wörz, Oviedo, FL (US); Jaap Van Kampen, Roermond (NL)

(73) Assignee: Siemens Atkiengesellschaft, Munich (DE)

( * ) Notice: Subject to any disclaimer, the term of this patent is extended or adjusted under 35 U.S.C. 154(b) by 0 days.

(21) Appl. No.: 13/576,698

(22) PCT Filed: Feb. 1, 2011

(86) PCT No.: PCT/EP2011/051371
§ 371 (c)(1),
(2), (4) Date: Nov. 15, 2012

(87) PCT Pub. No.: WO2011/104068
PCT Pub. Date: Sep. 1, 2011

(65) Prior Publication Data
US 2013/0067920 A1    Mar. 21, 2013

(30) Foreign Application Priority Data

Feb. 23, 2010  (EP) .................................... 10154353

(51) Int. Cl.
*F02C 7/22* (2006.01)
*F23R 3/14* (2006.01)
*F23R 3/36* (2006.01)

(52) U.S. Cl.
USPC ............................................... 60/737; 60/748

(58) Field of Classification Search
USPC ...................................................... 60/737, 748
See application file for complete search history.

(56) References Cited

U.S. PATENT DOCUMENTS

| | | | |
|---|---|---|---|
| 3,866,413 A * | 2/1975 | Sturgess | 60/748 |
| 5,235,813 A | 8/1993 | Kennedy | |
| 2006/0156734 A1 * | 7/2006 | Bland | 60/748 |
| 2006/0191268 A1 | 8/2006 | Johnson | |
| 2008/0078179 A1 | 4/2008 | Cai | |
| 2010/0212322 A1 * | 8/2010 | York et al. | 60/738 |

* cited by examiner

*Primary Examiner* — Ted Kim

(57) ABSTRACT

Disclosed is a gas turbine fuel injector and swirler assembly, including: a delivery tube structure arranged on a central axis of the fuel injector and swirler assembly, a first fuel supply channel arranged in the delivery tube structure, a shroud surrounding the delivery tube structure, swirl vanes arranged between the delivery tube structure and the shroud, a radial passage in each swirl vane, communicating with the first fuel supply channel, a set of apertures open between the radial passage and the exterior surface of said each swirl vane, wherein a second fuel supply channel is arranged in the delivery tube structure extending to a downstream end of the delivery tube structure and a mixer with lobes for fuel injection is arranged at the downstream end. Further disclosed is an assembly method for assembling a fuel injector and swirler assembly.

20 Claims, 4 Drawing Sheets

FUEL INJECTOR AND SWIRLER ASSEMBLY WITH LOBED MIXER

CROSS REFERENCE TO RELATED APPLICATIONS

This application is the U.S. National Stage of International Application No. PCT/EP2011/051371, filed Feb. 1, 2011 and claims the benefit thereof. The International Application claims the benefits of European Patent Office application No. 10154353.6 EP filed Feb. 23, 2010. All of the applications are incorporated by reference herein in their entirety.

FIELD OF THE INVENTION

The invention relates to a fuel injector and swirler assembly for a gas turbine. Further, the invention relates to a combustion system. The invention also relates to a gas turbine. In addition, the invention relates to an assembly procedure for assembling a fuel injector and swirler assembly.

BACKGROUND OF THE INVENTION

The increase of price of natural gas has pushed the development of gas turbines in the direction of considering alternative fuels such as the so called synthesis gases. These gases typically come from gasification processes of solid feedstock such a coal, pet coke or biomass. The use of synthesis gas in gas turbines involves a much larger volumetric flow injection of fuel than standard natural gas. In order to achieve the very low $NO_x$ values that are typical of modern gas turbines it is needed for the combustors to run in premixed mode. The fact of having such a large volumetric flow for the synthesis gas poses serious problems in firing them in a premixed mode. Another problem arising is the different reactivity of these fuels which can be different from natural gas; especially when there is a significant fraction of hydrogen the reactivity tends to be high, and this constitutes a problem as it aggravates the danger of flashback. These translate into the fact that a much larger fuel flow through the air passages leads to an increase in pressure drop, and that mixing between the air and fuel tends to be poor. The latest is mainly due to the fact that large volumetric flow rates also require large nozzles, which typically leads to bad mixing, and hence to high $NO_x$ emissions.

PCT/US2009/001336 shows an additional stage in the fuel injector and swirler assembly for injecting low calorific (LC) fuels. This stage supplies two additional rows of fuel injectors. The fuel injectors are implemented in the vanes of the swirlers and inject the fuel in a jet-in-cross flow mode. To provide the space for the two additional rows of injectors, the vanes are elongated in their upstream direction. Moreover the hub diameter has been increased to enlarge the space for the supply fuel flows. The combustor has demonstrated its functionality in terms of flashback resistance and low dynamics. However, one problem with this design is that the capacity of the LC fuel passage is still relatively small, and that in order to keep the fuel side pressure drop as low as possible, the natural gas stages are also used for injecting the LC fuel. This makes the system relatively complicated in terms of fuel supply splits. Even when splitting the LC-fuel over all stages, pressure drops are relatively large. Moreover, the injectors for the LC fuel are relatively small. Since these fuels are typically contaminated, a clogging issue could arise.

SUMMARY OF THE INVENTION

An object of the invention is to provide a fuel injector and swirler assembly with an improved mixing rate between air and fuel. Another object of the invention is to provide a combustion system allowing the combustor to operate in premixed mode, without increasing the pressure loss. Yet another object of the invention is an improved gas turbine. A further object of the invention is to provide an assembly method for an improved fuel injector and swirler assembly.

These objects are achieved by the claims. The dependent claims describe advantageous developments and modifications of the invention.

An inventive gas turbine fuel injector and swirler assembly comprises a delivery tube structure arranged on a central axis of the fuel injector and swirler assembly, a first fuel supply channel arranged in the delivery tube structure, a shroud surrounding the delivery fuel structure, swirl vanes arranged between the delivery tube structure and the shroud, a radial passage in each swirl vane, the radial passage communicating with the first fuel supply channel, a set of apertures open between the radial passage and the exterior surface of said each swirl vane, wherein a second fuel supply channel is arranged in the delivery tube structure extending to a downstream end of the delivery tube structure and a mixer with lobes for fuel injection is arranged at the downstream end.

Due to the relatively large central fuel injection the inventive fuel injector and swirler assembly reduces the pressure loss during operation with low calorific fuels. The injection of the reactive LC fuels in the centre of the fuel injector and swirler assembly also reduces the danger for flashback along the walls of the fuel injector and swirler assembly or the swirler cup compared to prior art solutions with LC fuel injection through the swirl vanes. Furthermore the susceptibility for clogging issues is reduced as a result of the relatively large second fuel supply channel. In this context it is also important that the first fuel supply channel for (for example) natural gas, does not have to be used during low calorific fuel operation.

The second fuel supply channel for LC fuel having the lobed mixer arranged at its end can be sealed with an inert medium (N2 or steam), or with seal air from the mid-frame of the gas turbine to prevent any flow recirculation when this lobed mixer fuel passage is not used.

In an advantageous embodiment the delivery tube structure comprises coaxial cylindrical inner and outer tubes, providing a first fuel supply channel in the inner tube and forming an annular second fuel supply channel between the inner and outer tubes.

In another advantageous embodiment each lobe of the mixer is located directly downstream a swirl vane.

In yet another advantageous embodiment a number of lobes is equal to a number of swirl vanes.

It is particularly advantageous when the lobed mixer has a twist and when the twist of the lobed mixer follows a swirl induced by the swirl vanes. The swirl flow path is then maintained and the mixer acts like an extension of the swirl vanes providing an aerodynamic application in a swirled flow.

In an advantageous arrangement a twist angle of the lobed mixer is up to 45°.

Preferably, a height of the lobes is up to 0.5 times an annulus height of the shroud Also preferably, a ratio between a height and a width of the lobes is between 0 and 8, preferably being 4.

In an advantageous embodiment a grain is arranged on a central axis of the lobed mixer. The grain effectively prevents that a fuel rich area remains unmixed in the centre of the lobed mixer.

Advantageously a combustion system comprises at least one of the previously described inventive fuel injectors and swirler assemblies.

An inventive gas turbine comprises such a combustion system.

In an inventive method of assembling a fuel injector and swirler assembly with a first fuel supply channel, a second fuel supply channel, radial passages, swirl vanes, a lobed mixer and a shroud, the lobed mixer is brazed or welded to the first fuel supply channel. Then a brazing material is applied at least between the central first fuel supply channel and the radial passages, between the second fuel supply channel and the radial passages and between the second fuel supply channel and the lobed swirler. The insofar assembled fuel injector and swirler assembly is then brazed in a furnace in one cycle.

It is advantageous, when the brazing material is also applied between the swirl vanes and the shroud before brazing the fuel injector and swirler assembly in the furnace.

Alternatively the shroud is welded, in particular tap welded, to the swirl vanes.

BRIEF DESCRIPTION OF THE DRAWINGS

The invention will now be further described with reference to the accompanying drawings in which.

Figure 1:
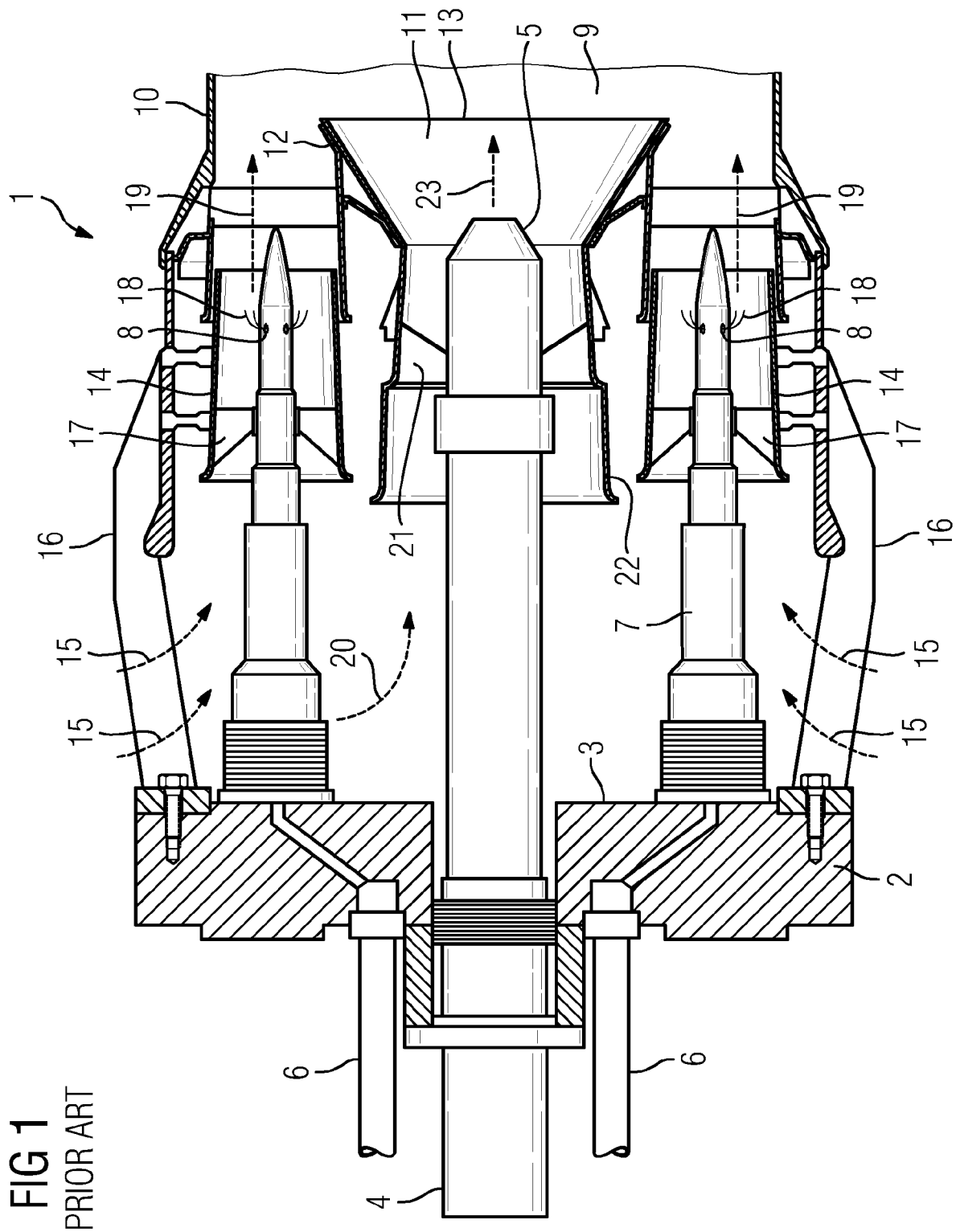
FIG. 1 shows a side sectional view of a prior art gas turbine combustor.

In the drawings like references identify like or equivalent parts.

DETAILED DESCRIPTION OF THE INVENTION

FIG. 1 shows an example of a prior art gas turbine combustor 1, some aspects of which may be applied to the present invention. A housing base 2 has an attachment surface 3. A pilot fuel delivery tube 4 has a pilot fuel diffusion nozzle 5. Fuel inlets 6 provide a main fuel supply to main fuel delivery tube structures 7 with injection ports 8. A main combustion zone 9 is formed within a liner 10 downstream of a pilot flame zone 11. A pilot cone 12 has a divergent end 13 that projects from the vicinity of the pilot fuel diffusion nozzle 5 downstream of main fuel injector and swirler assemblies 14. The pilot flame zone 11 is formed within the pilot cone 12 adjacent to and upstream of the main combustion zone 9.

Compressed air 15 from a compressor (not shown) flows between support ribs 16 through the swirler assemblies 14. Within each main swirler assembly 14, a plurality of swirler vanes 17 generate air turbulence upstream of main fuel injection ports 8 to mix compressed air 15 with fuel 18 to form a fuel/air mixture 19. The fuel/air mixture 19 flows into the main combustion zone 9 where it combusts. A portion of the compressed air 20 enters the pilot flame zone 11 through a set of vanes 21 located inside a pilot swirler assembly 22. The compressed air 20 mixes with the pilot fuel 23 within pilot cone 12 and flows into pilot flame zone 11 where it combusts. The pilot fuel 23 may diffuse into the air supply 20 at a pilot flame front, thus providing a richer mixture at the pilot flame front than the main fuel/air mixture 19. This maintains a stable pilot flame under all operating conditions.

The main fuel 18 and the pilot fuel 23 may be the same type of fuel or different types.

Figure 2:
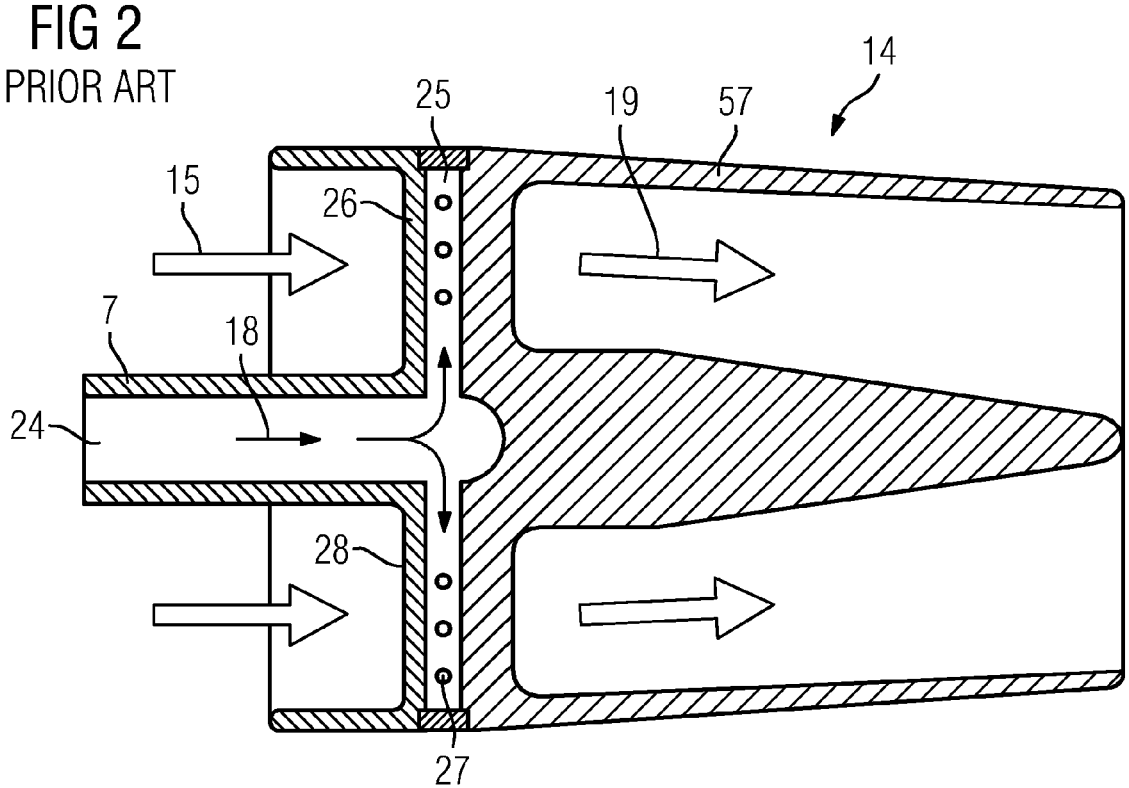
FIG. 2 shows a side sectional view of a prior art fuel injector and swirler assembly using injector swirler vanes.

FIG. 2 illustrates basic aspects of a compared to the gas turbine combustor of FIG. 1 refined prior art main fuel injector and swirler assembly 14 such as found in U.S. patent application Ser. No. 12/356,131 of the present assignee. A fuel supply channel 24 supplies fuel 18 to radial passages 25 in vanes 26 that extend radially from a fuel delivery tube structure 7 to the shroud 57. Combustion intake air 15 flows over the vanes 26. The fuel 18 is injected into the air 15 from apertures 27 open between the radial passages 25 and an exterior surface 28 of the vane. The vanes 26 are shaped to produce turbulence or swirling in the fuel/air mixture 19.

The prior design of FIG. 2 could use alternate fuels with similar viscosities and energy densities, but would not work as well for alternate fuels of highly dissimilar viscosities or energy densities. Synthesis gas has less than half the energy density of natural gas, so the injector flow rate for synthesis gas must be at least twice that of natural gas. This results in widely different injector design criteria for these two fuels.

Existing swirler assemblies have been refined over the years to achieve ever-increasing standards of performance. Altering a proven swirler design could impair its performance. For example, increasing the thickness of the vanes 26 to accommodate a wider radial passage for a lower-energy-density fuel would increase pressure losses through the swirler assemblies, since there would be less open area through them. To overcome this problem, higher fuel pressure could be provided for the low-energy-density fuel instead of wider passages. However, this causes other complexities and expenses. Accordingly, it is desirable to maintain current design aspects of the swirler assembly with respect to a first fuel such as natural gas as much as possible, while adding a capability to alternately use a lower-energy-density fuel such as synthetic gas.

Figure 3:
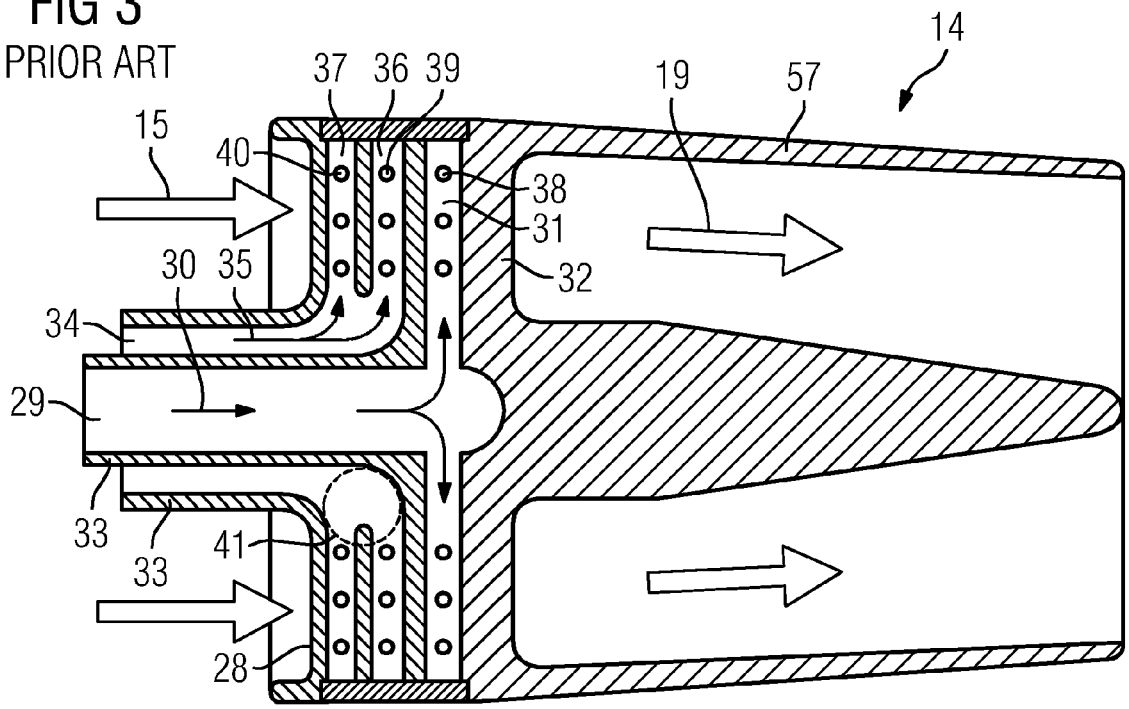
FIG. 3 shows a side sectional view of a prior art fuel injector and swirler assembly with a dual passage fuel supply to swirler vanes.

FIG. 3 illustrates aspects of another, improved, prior art design. A first fuel supply channel 29 provides a first fuel 30 to a first radial passage 31 in vanes 32 that extend radially from a fuel delivery tube structure 33. Alternately, a second fuel supply channel 34 provides a second fuel 35 to second and third radial passages 36, 37 in the vanes 32. The fuel delivery tube structure 33 may be formed as concentric tubes as shown, or in another configuration of tubes. Combustion intake air 15 flows over the vanes 32. The first fuel 30 is injected into the air 15 from first apertures 38 formed between the first radial passages 31 and an exterior surface 28 of the vane. Selectably, the second fuel 35 is injected into the air 15 from second and third sets of apertures 39, 40 formed between the respective second and third radial passages 36, 37 and the exterior surface 28 of the vane. The vanes 32 may be shaped to produce turbulence in the fuel/air mixture 19, such as by swirling or other means, and may have pressure and suction sides.

The first fuel delivery pathway 29, 31, 38 provides a firs flow rate at a given backpressure. In order to accommodate fuels with dissimilar energy densities, the second fuel delivery pathway 34, 36, 37, 39, 40 provides a second flow rate at the given backpressure. The first and second flow rates may differ by at least a factor of two. This difference may be achieved by providing different cross-sectional areas of one or more respective portions of the first and second fuel delivery pathways, and may be enhanced by differences in the shapes of the two pathways. It was found that contouring the transition area 41 between the fuel supply channel 34 and the second and third radial passages 36,37 increases the fuel flow rate at a given backpressure, due to reduction of fuel turbulence. A more equal fuel pressure between the radial passages 36 and 37 was achieved by providing an equalization area or plenum 41 in the transition area, as shown. This equalization area 41 is an enlarged and rounded or graduated common volume of the proximal ends of the radial passages 36 and 37. A partition between the radial passages 36 and 37 may start radially outwardly of the second fuel supply channel 34. This creates a small plenum 41 that reduces or eliminates an upstream/downstream pressure differential at the proximal ends of the respective radial passages 37, 36.

Figure 4:
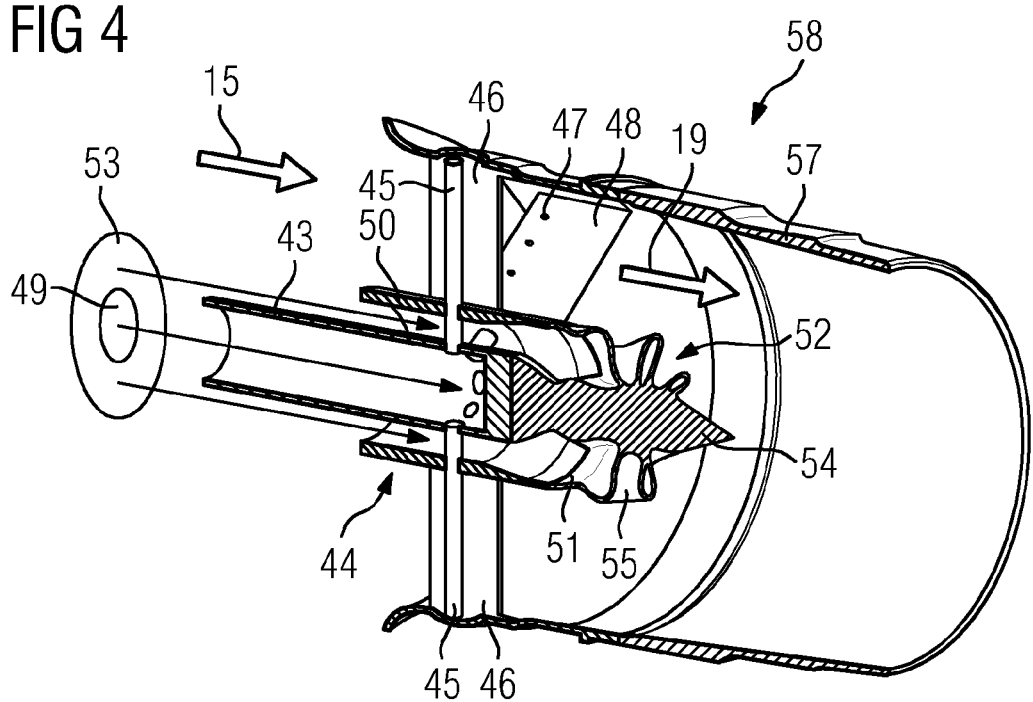
FIG. 4 shows fuel injector and swirler assembly according to the invention with a lobed mixer.
Figure 5:
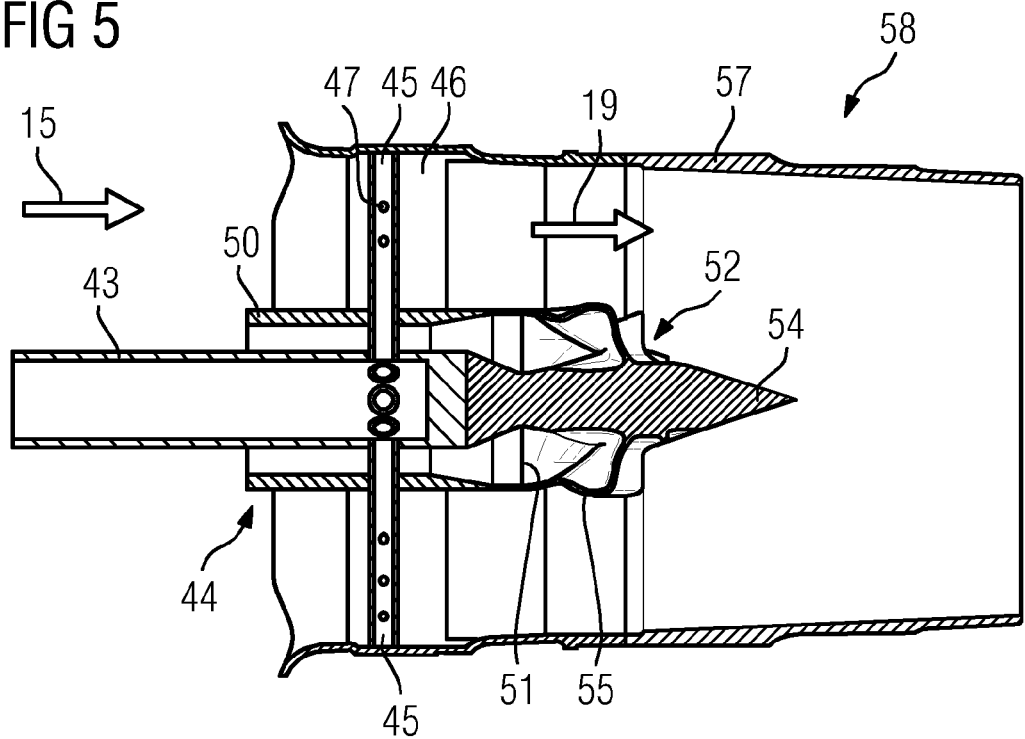
FIG. 5 shows another view of the fuel injector and swirler assembly of FIG. 4.

FIGS. 4 and 5 illustrate aspects of a fuel injector and swirler assembly 58 according to the invention. A delivery tube structure 44 comprises coaxial cylindrical inner and outer tubes, providing a first fuel supply channel 43 in the inner tube and forming an annular second fuel supply channel 50 between the inner and outer tubes. Radial passages 45 in the swirl vanes 46 communicate with the first fuel supply channel 43. A set of apertures 47 open between the radial passage 45 and the exterior surface 48 of the swirl vanes 46. A first fuel, for example natural gas 49, is supplied to the radial passages 45 and the apertures 47 via the first fuel supply channel 43 which is the inner tube of the delivery tube structure 44. A second fuel supply channel 50 is arranged in the delivery tube structure 44 and extends to a downstream end 51 of the delivery tube structure 44, where a lobed mixer 52 injects a second fuel, for example a synthesis gas fuel 53, into the air 15 or fuel/air mixture 19 respectively in a co-flow arrangement. Due to the folded edges (=lobes 55) of the lobed mixer 52, the contact surface between second fuel 53 and air 15 or first fuel/air mixture 19 is large. Moreover, secondary flow effects will be reduced. Both these aspects lead to a very good mixing performance of the injectors. Furthermore, a grain 54 is introduced in the middle of the lobed mixer 52, effectively preventing that a fuel rich area remains unmixed in the centre. To maintain the swirl flow path, the lobes 55 of the mixer 52 are given a twist. Also the number of lobes 55 is preferably equal to the number of vanes 46, and each lobe 55 is located directly downstream a vane 46. FIGS. 4 and 5 represent a design in which the LC-fuel capacity is large enough to inject LC fuels with a Wobbe number >10MJ/Nm3. The larger passage for the LC fuel supply also reduces the risk for clogging.

Figure 6:
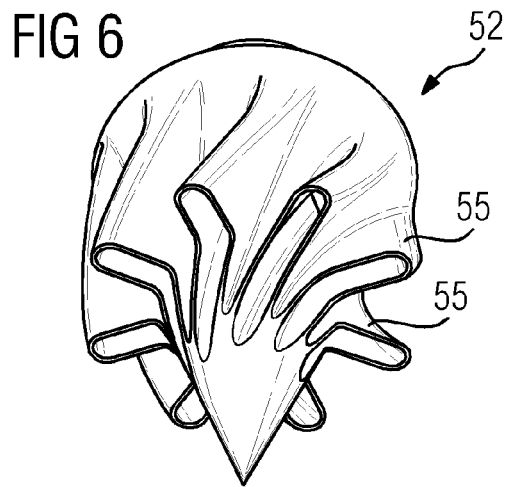
FIG. 6 shows a lobed mixer with twist.
Figure 7:
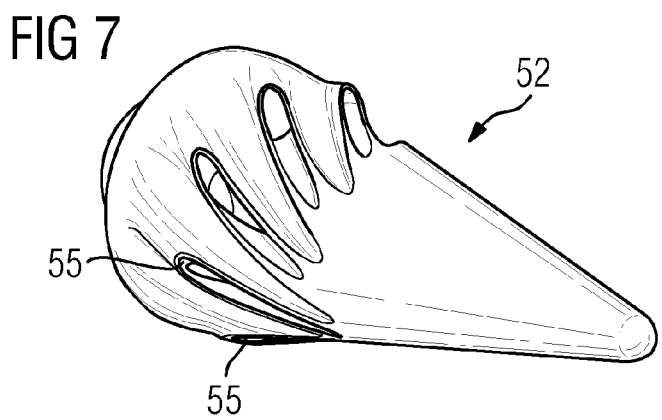
FIG. 7 shows a lobed mixer with twist with reduced lobe height.

FIGS. 6 and 7 show two versions of the lobed mixer 52, both versions have a twist incorporated to follow the swirl induced by the upstream swirl vanes 46. Adding a twist to the lobes of the mixer allows for a better follow-up of the stream line of the air in the swirler cups. As a variation to this, however, an untwisted lobed mixer may also be implemented. The twist angle of the lobed mixer may be between 0° and 45°. The height of the lobes may lie between 0 and 0.5 times the annulus height of the shroud 57. Another important parameter of the lobes is the ratio between their height and their width. This ratio should lie between 0 and 8, with a preferred value of 4. A ratio of 0 represents the situation in which the lobes are flat, and effectively a jet-in-cross flow injection is used. This more or less corresponds with the design shown in FIG. 7.

When the combustion system is operating on the backup fuel (fuel oil or natural gas) the lobed mixer 52 may be purged with an inert medium (N2 or steam) or with seal air from the mid frame of the gas turbine.

Figure 8:
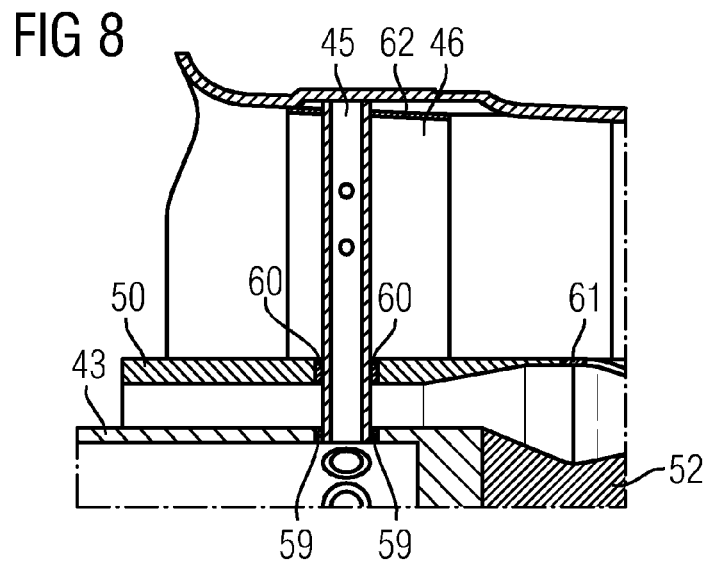
FIG. 8 shows the brazing step of the assembly of the fuel injector and swirler assembly.

For assembling this fuel injector and swirler assembly, the lobed mixer 52 is first welded or brazed to the central first fuel (natural gas) supply channel 43. FIG. 8 illustrates the brazing locations of the next assembling steps. After having jointed the lobed mixer 52 and the first fuel supply channel 43 a brazing material is applied at least between central first fuel supply channel 43 and the radial passages 45 (see reference sign 59), between the second fuel supply channel 50 and the radial passages 45 (see reference sign 60) and between the second fuel supply channel 50 and the lobed swirler 52 (see reference sign 61). The assembled component is then brazed in a high temperature vacuum furnace in one cycle.

Either, in the same breath, brazing material is also applied between the swirl vanes 46 and the shroud 57 (see reference sign 62) or, after the component left the furnace, the shroud 57 is welded, in particular tap welded, to the swirl vanes 46.

What is claimed is:

1. A gas turbine fuel injector and swirler assembly, comprising:
   a delivery tube structure arranged on a central axis of the fuel injector and swirler assembly;
   a first fuel supply channel arranged in the delivery tube structure;
   a shroud surrounding the delivery tube structure;
   a plurality of swirl vanes arranged between the delivery tube structure and the shroud;
   a radial passage in each swirl vane, communicating with the first fuel supply channel;
   a set of apertures open between the radial passage and the exterior surface of each swirl vane; and
   a second fuel supply channel arranged in the delivery tube structure extending to a downstream end of the delivery tube structure,
   wherein a mixer with a plurality of lobes for fuel injection is arranged at the downstream end.

2. The fuel injector and swirler assembly as claimed in claim 1, wherein the delivery tube structure comprises coaxial cylindrical inner and outer tubes, providing the first fuel supply channel in the inner tube and forming the annular second fuel supply channel between the inner and outer tubes.

3. The fuel injector and swirler assembly as claimed in claim 1, wherein each lobe of the mixer is located directly downstream a swirl vane.

4. The fuel injector and swirler assembly as claimed in claim 1, wherein a number of lobes is equal to a number of swirl vanes.

5. The fuel injector and swirler assembly as claimed in claim 1, wherein the lobed mixer has a twist.

6. The fuel injector and swirler assembly as claimed in claim 5, wherein the twist of the lobed mixer follows a swirl induced by the plurality of swirl vanes.

7. The fuel injector and swirler assembly as claimed in claim 5, wherein a twist angle of the lobed mixer is up to 45°.

8. The fuel injector and swirler assembly as claimed in claim 1, wherein a height of each lobe is up to 0.5 times an annulus height of the shroud.

9. The fuel injector and swirler assembly as claimed in claim 1, wherein a ratio between a height and a width of each lobe is between 0 and 8.

10. The fuel injector and swirler assembly as claimed in claim 9, wherein the ratio between the height and the width of the plurality of lobes is 4.

11. The fuel injector and swirler assembly as claimed in claim 1, wherein a grain is arranged on a central axis of the lobed mixer.

12. A combustion system, comprising:
    a gas turbine fuel injector and swirler assembly as claimed in claim 1.

13. The combustion system as claimed in claim 12, wherein the delivery tube structure comprises coaxial cylindrical inner and outer tubes, providing the first fuel supply channel in the inner tube and forming the annular second fuel supply channel between the inner and outer tubes.

14. The combustion system as claimed in claim 12, wherein each lobe of the mixer is located directly downstream a swirl vane.

15. The combustion system as claimed in claim 12, wherein a number of lobes is equal to a number of swirl vanes.

16. The combustion system as claimed in claim 12, wherein the lobed mixer has a twist.

17. The combustion system as claimed in claim 16, wherein the twist of the lobed mixer follows a swirl induced by the plurality of swirl vanes.

18. The combustion system as claimed in claim 16, wherein a twist angle of the lobed mixer is up to 45°.

19. The combustion system as claimed in claim 12, wherein a height of each lobe is up to 0.5 times an annulus height of the shroud.

20. A gas turbine, comprising:
a combustion system as claimed in claim 12.

* * * * *